Feb. 10, 1942. W. R. CHESLEY 2,272,832
MACHINE FOR EMBOSSING AND SLOTTING BLANKS
Original Filed June 12, 1936 11 Sheets-Sheet 4

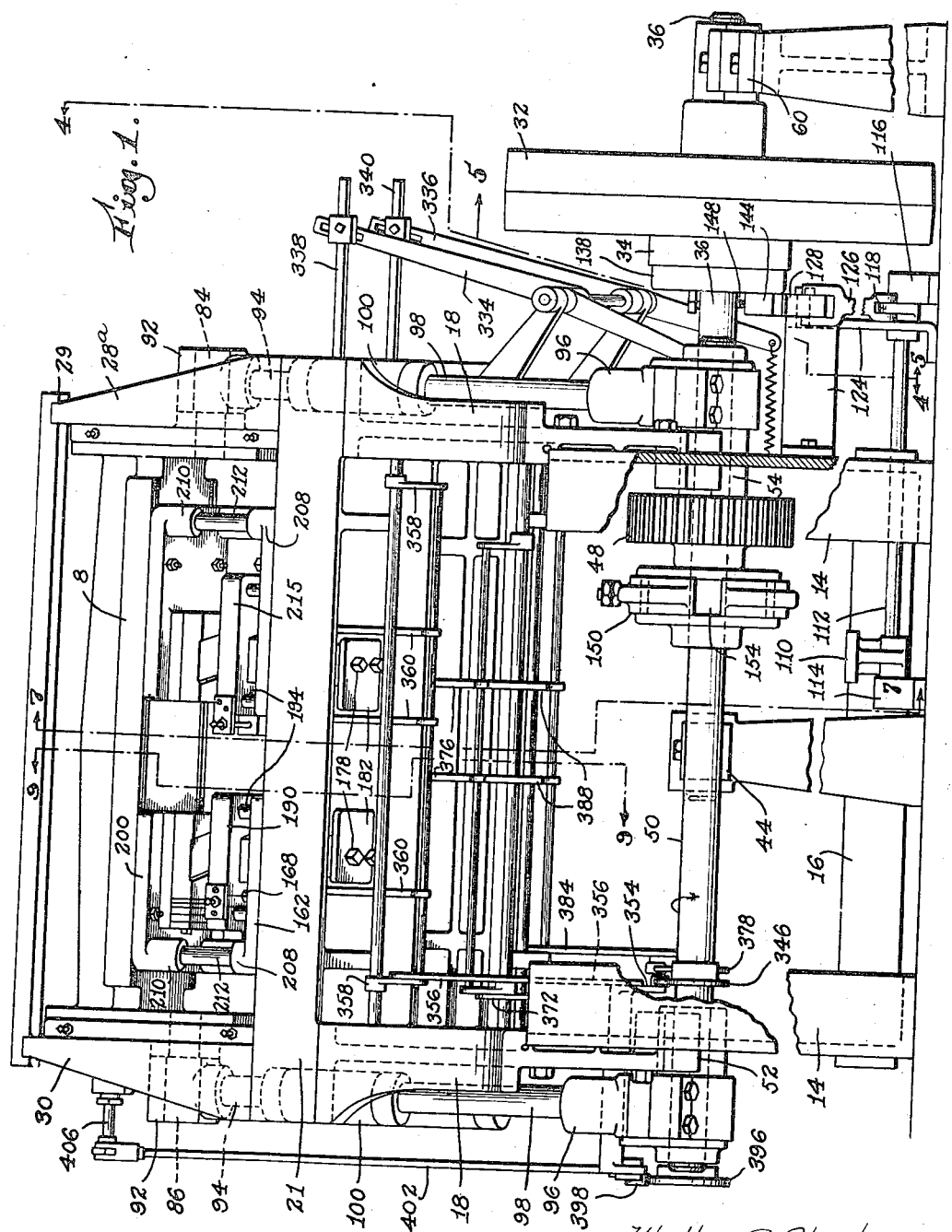

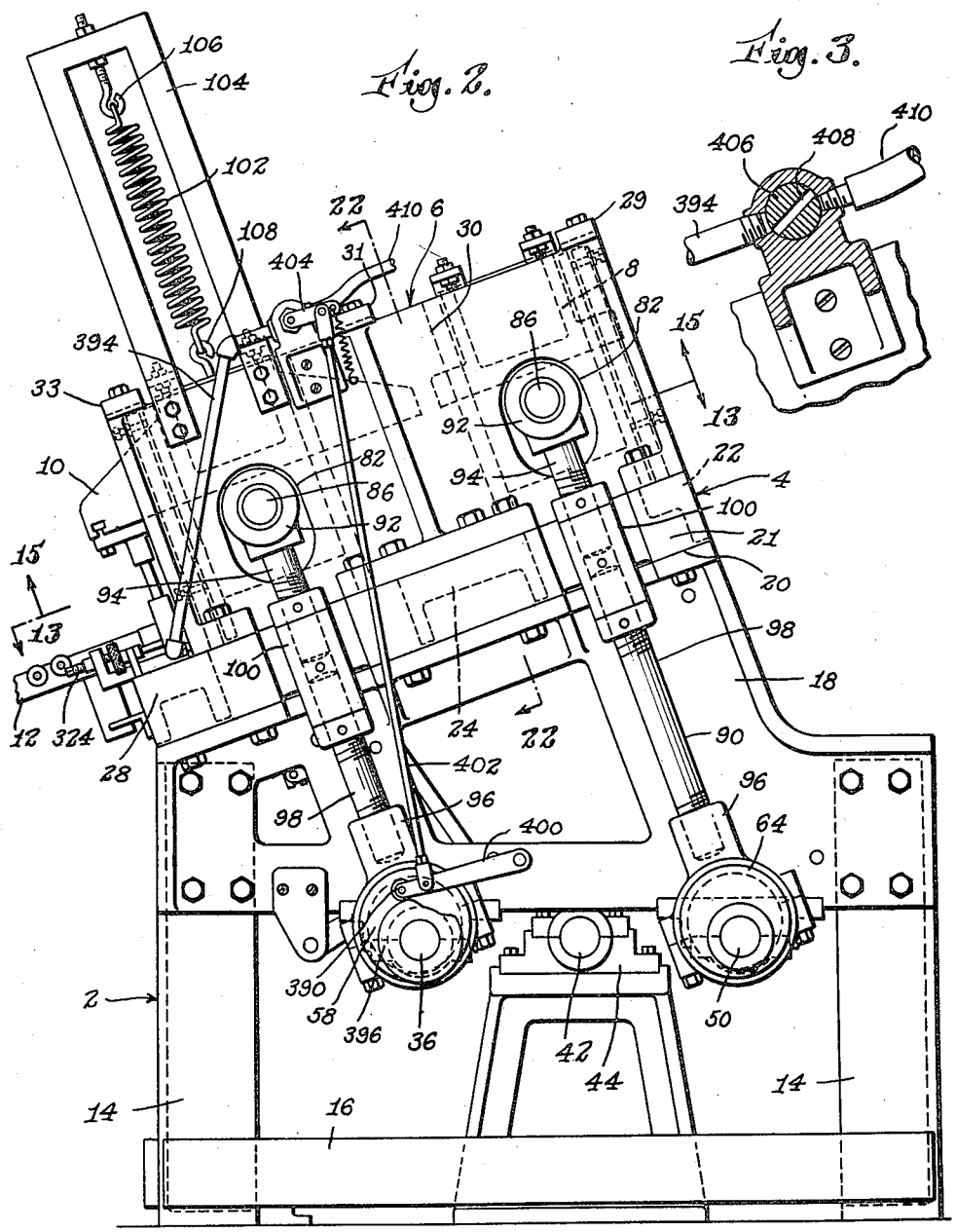

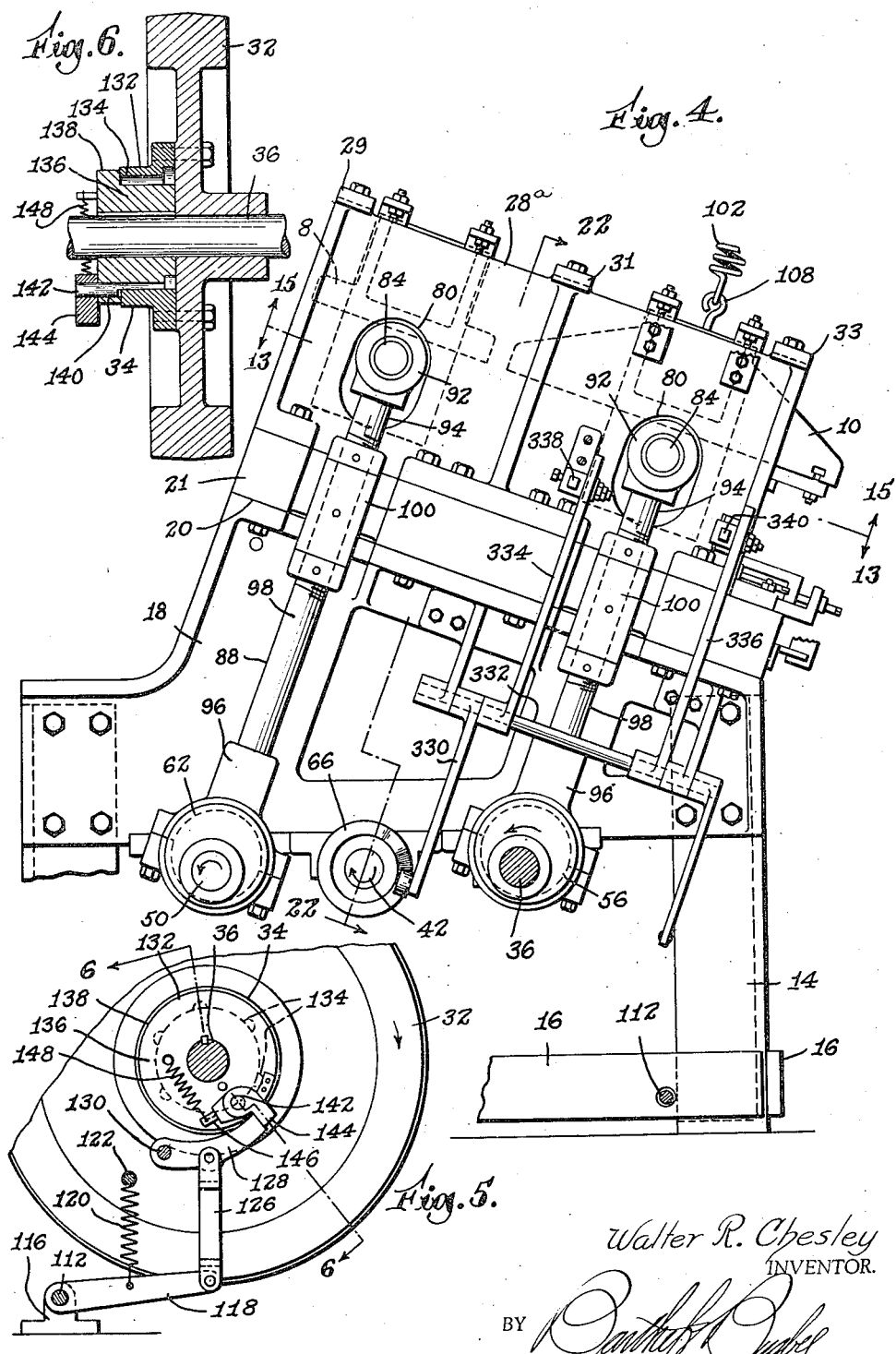

Walter R. Chesley
INVENTOR.
BY
ATTORNEYS

Feb. 10, 1942. W. R. CHESLEY 2,272,832
MACHINE FOR EMBOSSING AND SLOTTING BLANKS
Original Filed June 12, 1936 11 Sheets-Sheet 5
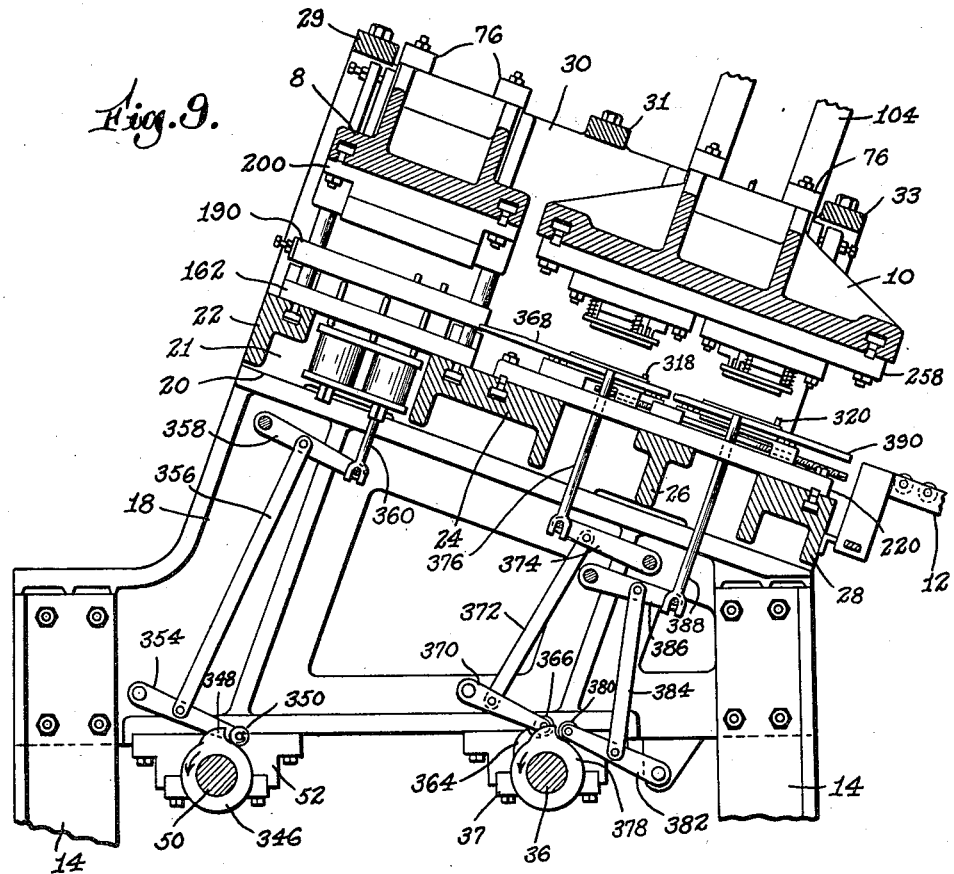
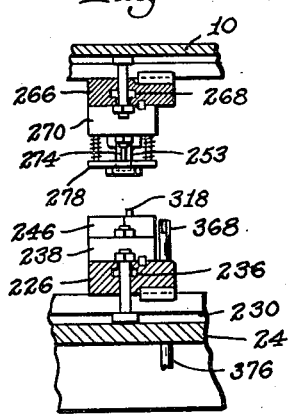
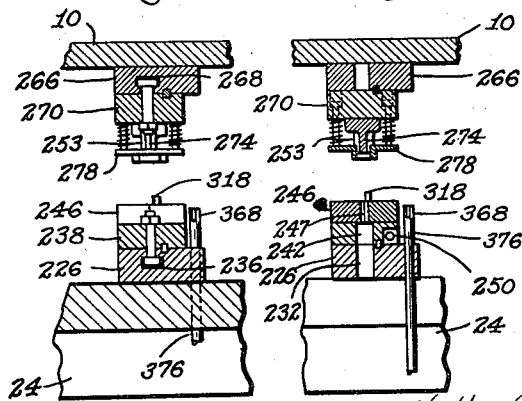

Feb. 10, 1942.  W. R. CHESLEY  2,272,832
MACHINE FOR EMBOSSING AND SLOTTING BLANKS
Original Filed June 12, 1936  11 Sheets-Sheet 6

Walter R. Chesley
INVENTOR.

BY
ATTORNEYS

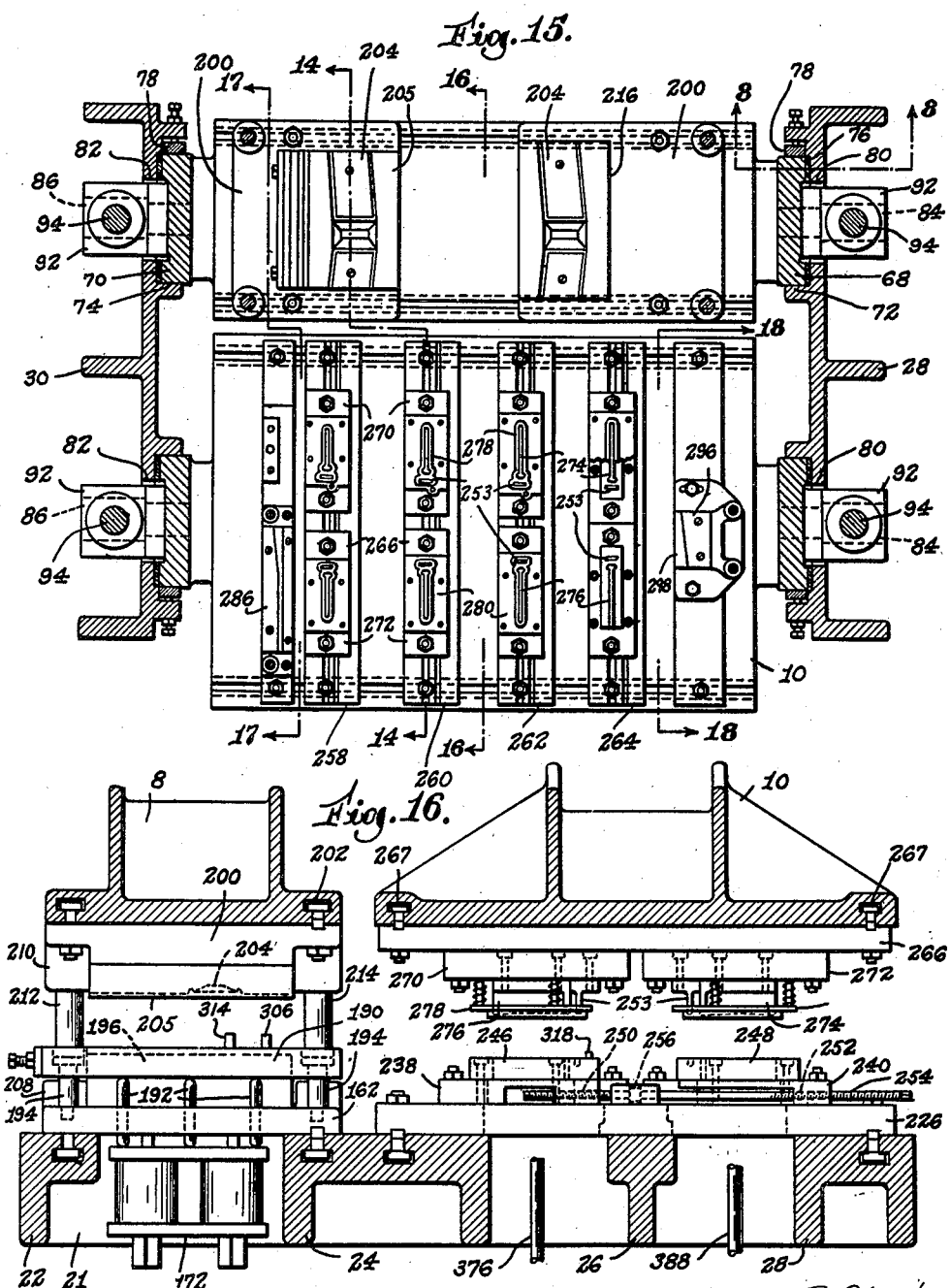

Feb. 10, 1942.   W. R. CHESLEY   2,272,832
MACHINE FOR EMBOSSING AND SLOTTING BLANKS
Original Filed June 12, 1936   11 Sheets-Sheet 8
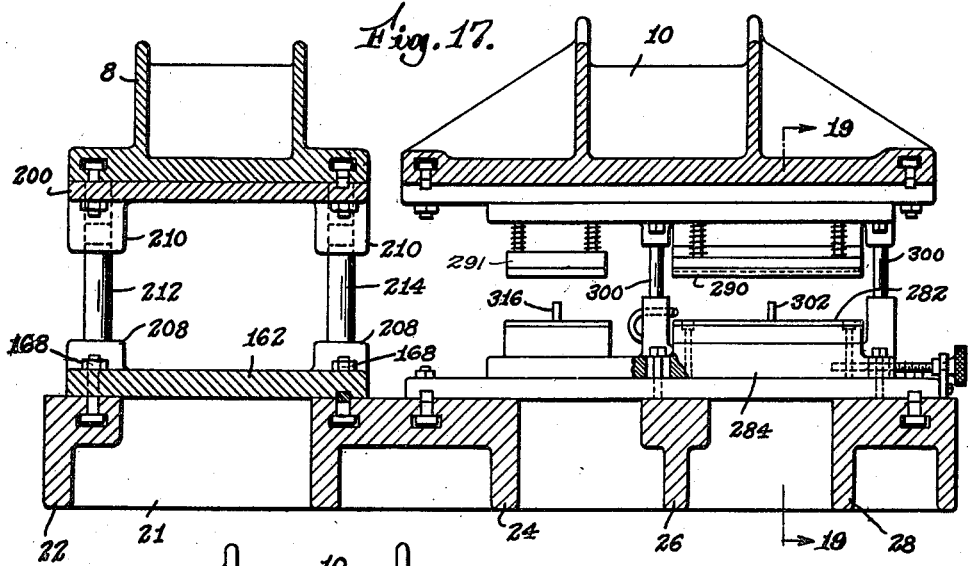
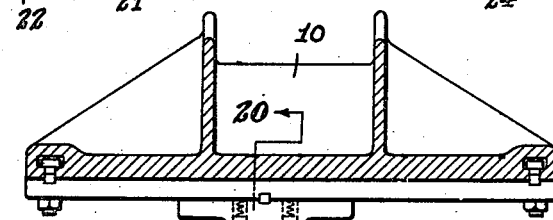
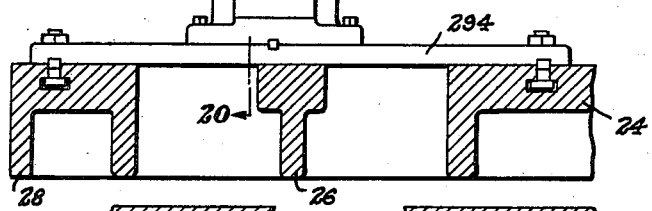
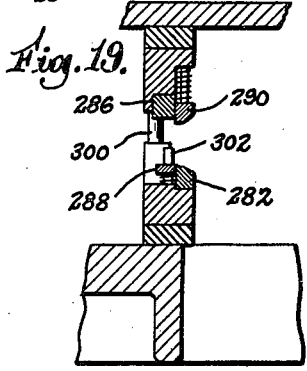 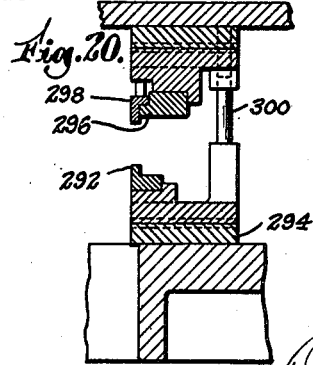 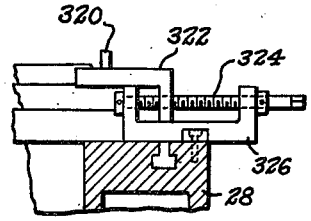

Feb. 10, 1942.   W. R. CHESLEY   2,272,832
MACHINE FOR EMBOSSING AND SLOTTING BLANKS
Original Filed June 12, 1936   11 Sheets-Sheet 9
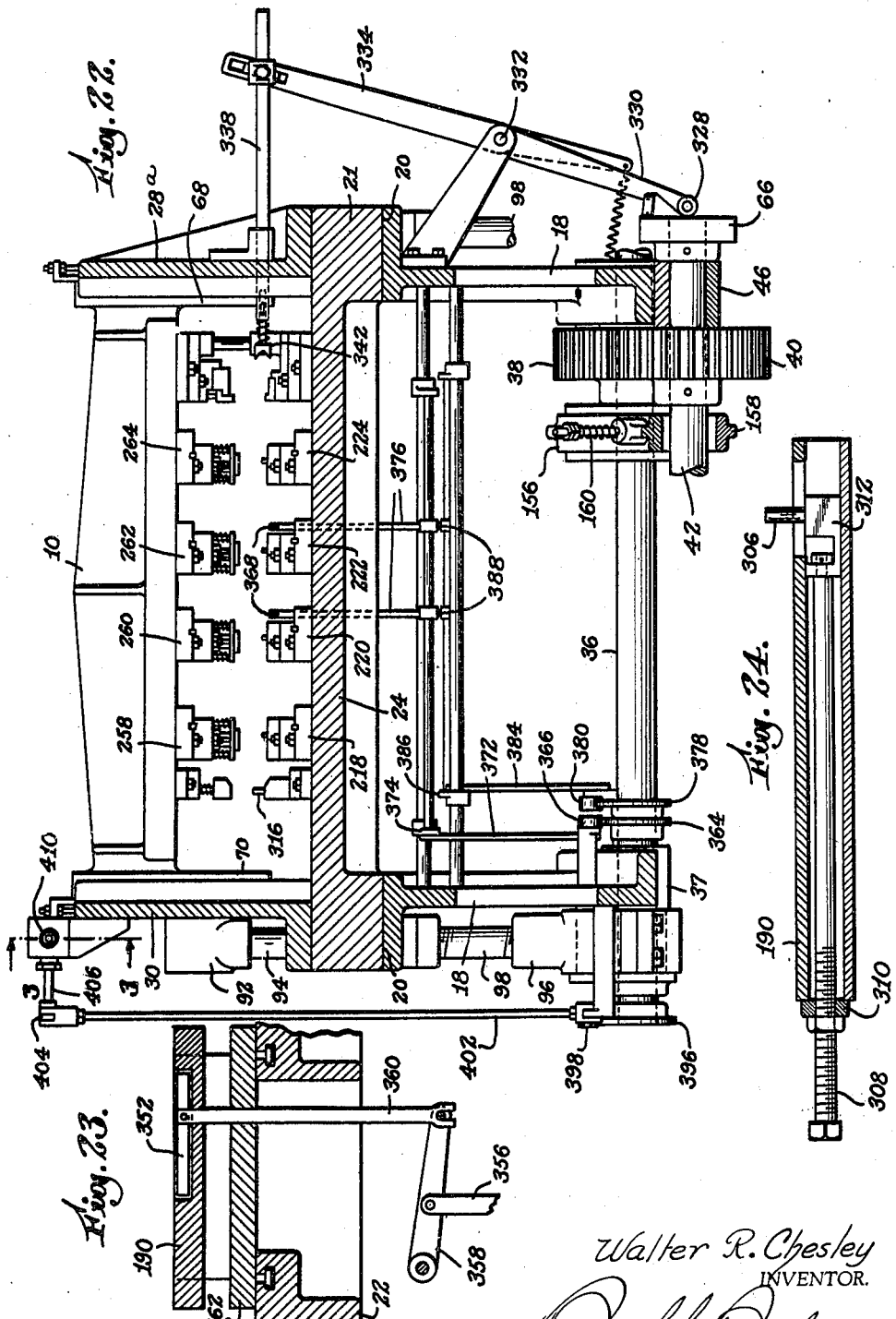
Walter R. Chesley
INVENTOR.
BY
ATTORNEYS Feb. 10, 1942.   W. R. CHESLEY   2,272,832
MACHINE FOR EMBOSSING AND SLOTTING BLANKS
Original Filed June 12, 1936   11 Sheets-Sheet 10

Walter R. Chesley
INVENTOR.
BY
ATTORNEYS

Feb. 10, 1942. W. R. CHESLEY 2,272,832
MACHINE FOR EMBOSSING AND SLOTTING BLANKS
Original Filed June 12, 1936   11 Sheets-Sheet 11
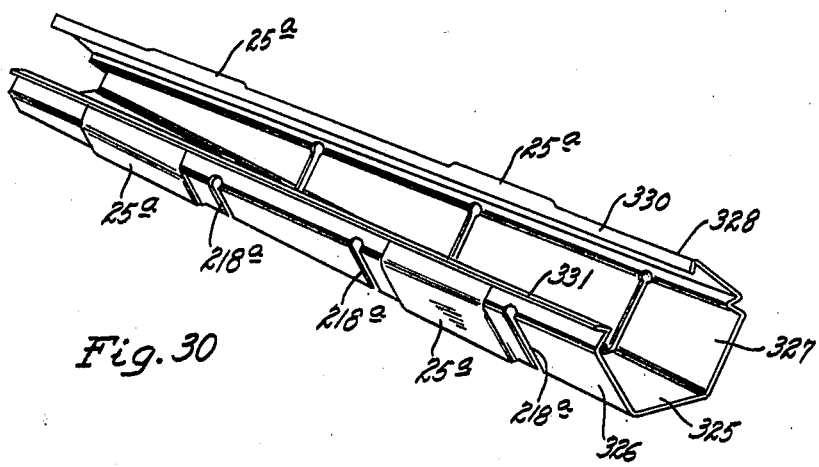
Fig. 30
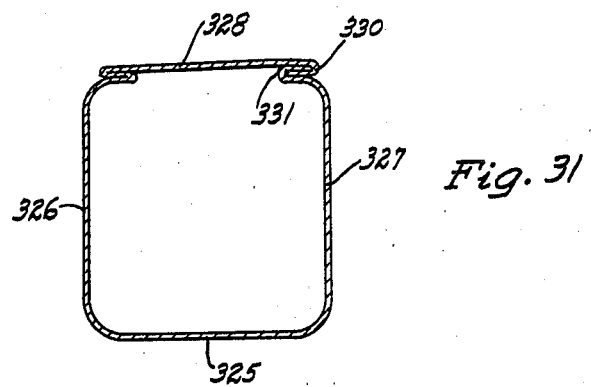
Fig. 31
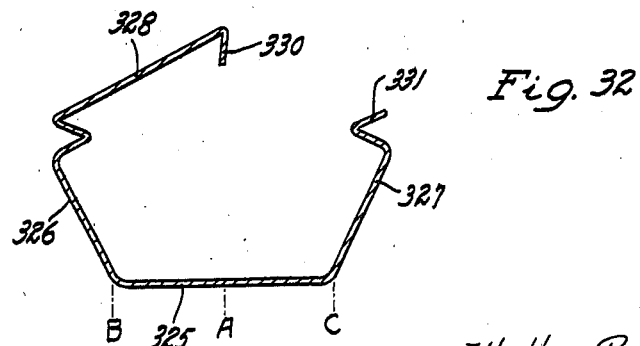
Fig. 32
Walter R. Chesley
INVENTOR.
BY 
ATTORNEYS Patented Feb. 10, 1942

2,272,832

UNITED STATES PATENT OFFICE 2,272,832

MACHINE FOR EMBOSSING AND SLOTTING BLANKS

Walter R. Chesley, Somerville, Mass., assignor, by mesne assignments, to Reconstruction Finance Corporation, Detroit, Mich., a corporation of the United States Original application June 12, 1936, Serial No. 84,886, now Patent No. 2,233,000, dated February 25, 1941. Divided and this application April 29, 1940, Serial No. 332,311

13 Claims. (Cl. 164—21)

This invention relates generally to forming and punching apparatus and more particularly to a machine for making blanks from which elliptical spring covers may be made.

This application is a division of my pending application filed June 12, 1936, Serial No. 84,886, and entitled "Machine for and method of embossing and slotting blanks."

It is an object of the present invention to provide a new and improved machine for making spring cover blanks at a high production rate.

Another object of the invention is to provide a machine of the above mentioned character having provision for adjustment of a slot making series of punches toward and away from another series of slotting punches to provide for the making of slots of different lengths in spring cover blanks.

Another object of the invention is to provide a machine for making spring casing blanks and one having provision for automatically feeding the blanks to a series of die tools.

The invention consists in the improved construction and combination of the parts to be more fully described hereinafter and the novelty of which will be particularly pointed out and distinctly claimed.

In the accompanying drawings to be taken as a part of this specification I have clearly and fully illustrated my invention, in which drawings:

Figure 1 is a front view of the machine;

Fig. 2 is a side view of the machine looking from left to right of Fig. 1;

Fig. 3 is a detailed view in cross section, taken along the line and in the direction of the arrows 3—3 of Fig. 22;

Fig. 4 is a fragmentary side view of the machine as shown looking from right to left of Fig. 1;

Fig. 5 is a fragmentary view of a clutch for the machine, taken along the line and in the direction of the arrows 5—5 of Fig. 1;

Fig. 6 is a view shown in cross section of the clutch, taken along the line and in the direction of the arrows 6—6 of Fig. 5;

Fig. 9 is a view partly in section and partly in elevation, taken along the line and in the direction of the arrows 9—9 of Fig. 1;

Figs. 10, 11 and 12 are detail sectional views, taken respectively along the lines 10—10, 11—11, 12—12, of Fig. 14;

Fig. 13 is a view shown partly in section and partly in elevation, taken along the lines and in the direction of the arrows 13—13 of either Fig. 2 or Fig. 4;

Fig. 14 is a view shown partly in vertical section and partly in elevation, taken along the line 14—14 of Fig. 15;

Fig. 15 is a view partly in elevation and partly in section, taken along the line 15—15 of Fig. 2;

Fig. 16 is a view shown in section, taken along the line 16—16 of Fig. 13;

Fig. 17 is a view in cross section showing upper and lower trimming die structures, the lower die structure section being taken along the line 17—17 of Fig. 13 and the upper trimming die structure section being taken along the line 17—17 of Fig. 15;

Fig. 18 is a cross section of the trimming die structure, the lower trimming die section being taken along the line 18—18 of Fig. 13 and the upper trimming die section being taken along the line 18—18 of Fig. 15;

Fig. 19 is a fragmentary sectional view of the trimming dies, the section being taken along the line 19—19 of Fig. 17;

Fig. 20 is a fragmentary sectional view of the trimming die structure, taken along the line 20—20 of Fig. 18;

Fig. 21 is a detail view showing an adjustable stop, taken along the line 21—21 of Fig. 13;

Fig. 22 is a view shown in cross section of the machine, taken along the line 22—22 of either Fig. 2 or Fig. 4;

Fig. 23 is a fragmentary sectional view of an ejector mechanism, taken along the line 23—23 of Fig. 13;

Fig. 24 is a view shown in longitudinal section of adjustable stop mechanism;

Figures 7, 8:
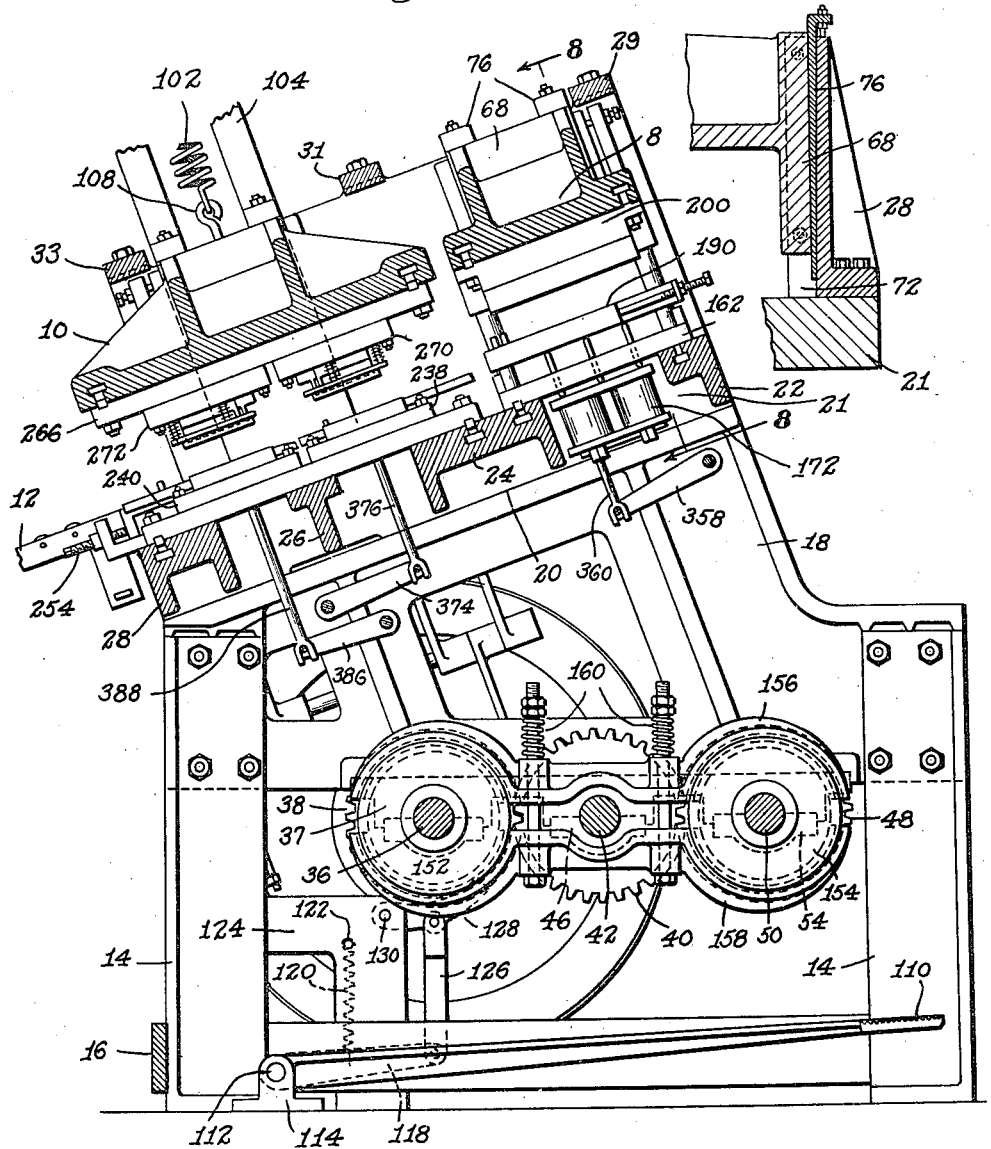
Fig. 7 is a view partly in elevation and partly in section, taken along the line and in the direction of the arrows 7—7 of Fig. 1.
Fig. 8 is a view shown in cross section, taken along the line and in the direction of the arrows 8—8 of Fig. 7.

Figs. 25 to 29 inclusive show a blank in the various stages of its completion;

Fig. 30 is a perspective view of a finished spring casing made from one of the prepared blanks; and Figs. 31 and 32 are views shown in cross section of the spring casing.

Referring now to the drawings, which disclose a preferred form of the invention, it can be seen from an inspection of Figs. 1, 2 and 4 that the machine consists, in general, of a base 2 on which are mounted suitable shafts for receiving power, a bed 4 mounted at an angle on the base and a head 6 which in the instant case comprises two main sliding heads 8 and 10. Between the bed and the sliding heads are positioned embossing dies and punches, provision being made for the automatic feeding of the blank from station to station after each preceding operation. In this case a gravity conveyer, shown at 12 in Figs. 2, 7 and 9, carries the partially finished cover away to machines that perform the subsequent operations.

General construction

As shown in Figs. 1, 2, 4 and 7 and in part in certain of the other figures, the base of the machine comprises four legs 14, suitably braced by horizontal members 16 and supporting at their upper ends parallel trusses 18. These trusses may be bolted, welded or be otherwise secured to the legs 14. The upper side of the trusses, which extend from the front to the rear of the machine, terminate in surfaces 20 sloping downwardly from the front to the rear of the machine. Bolted to the sloping upper surfaces 20 of trusses 18 is a bed 21 which has certain areas cut away to form transverse webs 22, 24, 26 and 28 as in Figs. 7 and 9. Mounted along the sides of bed 21 and extending from the front to the rear thereof are upwardly extending guide members 28a and 30 which are shown in Figs. 1, 4 and 22 and which provide the slides in which the movable heads 8 and 10 travel. Members 28a and 30 have additional support at their upper ends in the form of transverse bars, 29, 31 and 33 which are bolted in position to increase the rigidity of the slides in which heads 8 and 10 operate.

Power is supplied by means of a belt-driven fly-wheel 32 shown in Fig. 1. By means of a clutch 34 adjacent the fly-wheel, details of which are shown in Figs. 5 and 6 and which will be described hereinafter, the power is transmitted to a main drive shaft 36 on which is mounted a spur gear 38 which meshes in turn with a spur gear 40 having the same number of teeth. The shaft 36 is supported by bearings 37 attached to trusses 18. The spur gear 40 is mounted on a transversely extending shaft 42 which is parallel to the shaft 36, the shaft 42 being supported at one end thereof by a bearing 44 and at the other end by a bearing 46 which is mounted on the truss 18. The spur gear 40 in turn meshes with a spur gear 48, of the same number of teeth, mounted on a shaft 50, whose bearings 52 and 54 are supported by the trusses 18.

Keyed to shaft 36, outwardly of the trusses 18, are eccentrics 56 and 58 as can be seen in Figs. 2 and 4. Eccentric 56 is, however, between the clutch 34 and the right hand truss 18. It should be pointed out at this time that the right hand extremity of shaft 36 is mounted on an outboard bearing 60, as is seen in Fig. 1, to provide additional support for the heavy fly-wheel 32.

On the ends of shaft 50, outwardly of the trusses 18 are keyed the eccentrics 62 and 64 shown in Figs. 2 and 4. All four eccentrics 56, 58, 62 and 64 are the same size and are keyed on shafts 36 and 50 at the same angularity. Thus it will be seen that, since spur gears 38, 40 and 48 all have the same number of teeth, the eccentrics will always be in the same relative angular positions. On the right hand end of the shaft 42, when viewed from the front of the machine, is a cam 66 shown in Figs. 4 and 22, the purpose of which will be more fully described hereinafter.

The head 8, at its ends, has depending portions 68 and 70 which are adapted for sliding engagement in slide-ways 72 and 74 formed on the inner sides of the guide members 28a and 30, see Figs. 13 and 15. The direction of movement of the head 8 is at right angles to the bed 21 and adjustable gibs 76, to take up any lateral play, are provided, as shown in Figs. 13 and 15. A detail of this construction is shown in Fig. 8. Further adjustment for the head 8 is provided by the adjustable gibs 78 shown in Figs. 13 and 15.

Two holes 80 are provided in the wall of the guide member 28a and two similar holes 82 are provided in the guide member 30. On either end of the heads 8 and 10 are trunnions 84 and 86 which extend through the holes 80 and 82. The trunnions 84 and 86 on head 8 are directly connected respectively with the eccentrics 62 and 64 by means of connecting rods 88 and 90. Connecting rod 88 is provided with an eye 92 from which extends a threaded rod 94 having an internally threaded member 100 screwed thereon, the lower end of member 100 being connected to one end of a threaded rod 98 having its other end connected to a strap 96 which surrounds the eccentric 62. The rods 94 and 98 have opposite threads, and therefore their connection by member 100 forms a turnbuckle so that by rotation of member 100 the distance between the trunnion 84 and eccentric 62 can be varied. Similarly the trunnion 86 of head 8 is connected with the eccentric 64 by a turnbuckle arrangement similar to that just described and the various parts have been numbered identically. Thus, as shaft 50 is rotated, the head 8 will be caused to slide up and down in guides 72 and 74 under the influence of the eccentrics 62 and 64. In like fashion, the head 10, having similar trunnions 84 and 86, is connected by similar adjustable connecting rods to eccentrics 56 and 58. Since the connecting rods are identical in structure with those used with head 8 they have been numbered similarly.

Since shafts 36 and 50 rotate in the same direction and at the same speed, due to gears 38, 40 and 48 and since the eccentrics 56 and 58 and 62 and 64 are keyed to their respective shafts at the same angularity, it is apparent that for one revolution of shaft 36 with the attendant revolution of shaft 50, the heads 8 and 10 will pass through one complete cycle of movement. With the eccentrics set as shown the movement of the heads will start from their uppermost position, travelling downwardly and thereafter back to the starting point.

To assist in the upward return of head 10 a tension spring 102 is provided above the frame and is supported by a superstructure 104 of sufficient strength, to which the upper end of the spring 102 is attached, as at 106. The lower end of the spring 102 is attached to an eye 108 which in turn is secured to the head 10. Thus, it can be seen that when the head 10 descends the spring 102 will be loaded to assist thereafter in the upward return of the head 10. If necessary, a similar arrangement could be applied to head 8 or, under certain circumstances, depending on the masses involved, the spring 102 could be eliminated.

Clutch

The clutch used on the machine is of the so-called one-revolution type, by which is meant that after engagement of the clutch members, the driven shaft will revolve but once, at which time automatic disengagement of the clutch will take place unless the treadle, under the control of the operator, be held down. In the clutch shown, if the treadle is held down the driven shaft will rotate continuously. It is intended, however, that the heads go through but a single cycle.

Referring now to Fig. 1 there is shown a treadle 110 which is pinned to a shaft 112 carried by bearings 114 and 116. At the right hand end of shaft 112 is pinned a lever 118 normally held in a raised position along with treadle 110 by a spring 120, the upper end of the spring being attached to a pin 122 which extends from the right hand end of a support 124 which is bolted to and at the lower right side of the frame, see Fig. 7. Connected to and extending upwardly from the end of lever 118 a link 126 is pivoted at its upper end to a lever 128, which lever is fulcrumed on a pin 130, mounted on the support 124.

The foregoing described treadle and linkage is the foot control mechanism for the clutch 34 which can be seen in detail in Figs. 5 and 6. Referring to Fig. 6 the fly-wheel 32 is freely rotatable on the shaft 36 and bolted to the fly-wheel is a sleeve 132 having a series of semi-cylindrical longitudinally extending slots, as at 134. Extending within the sleeve 132, but keyed to the shaft 36, is a collar 136 having an outer flange 138 which at a point near its circumference is provided with a hole 140. The hole 140 is so positioned that the outer half of its circumference coincides with the longitudinally extending semi-cylindrical slots 134 that extend around the inside of the sleeve 132. Positioned in the hole 140, a pin 142, as can be seen in Fig. 6, is provided and on its outer end is secured a pawl 144 which is engaged by the end of the lever 128. The inner end of the pin 142, which is adjacent sleeve 132, is semi-circular in cross section and, when the pawl 144 is in the position in Fig. 5, the semi-cylindrical portion of the pin 142 will be out of the path of the revolving slots 134 of the sleeve 132.

An arm 146, see Fig. 5, attached to the pawl 144 is secured to a tension spring 148 which tends to rotate the pawl in a clockwise direction. It will be seen that, if lever 128 is swung downwardly to clear the pawl 144, the effect of the spring 148 will be to rotate the pawl 144 and pin 142, to which it is attached, through approximately 90°. Thus, the semi-cylindrical portion of pin 142 will be turned so that half of the pin will engage one of the rotating slots 134. The result of this engagement will be that the collar 136 will be caused to rotate along with the fly-wheel. Since collar 136 is keyed to shaft 36 the shaft will be rotated and this in turn will result in the operation of gears 38, 40, and 48 along with the shafts 42 and 50.

As long as the lever 128 is held down by the operation of the foot treadle and out of the way of the pawl 144, the shaft 36 will continue to revolve. However, in the preferred operation, the treadle 110 is pressed down and then immediately released so that the lever 128 can resume the position shown in Fig. 5, the right hand end of the lever 128 engaging the pawl 144 as it approaches under the influence of rotating collar 136 thus, rotating pawl 144 and pin 142 counterclockwise to the original position, shown in Fig. 5. This counterclockwise rotation will cause the semi-cylindrical portion of pin 142 to become disengaged from the sleeve 132 and thus further rotation of shaft 36 is prevented.

To accomplish a single rotation of shaft 36, all that is necessary is to step on the treadle 110 and thereafter immediately release it. In this way the pawl 144 is momentarily freed so that the clutch mechanism may operate, but by the time the pawl 144 has made one revolution the lever 128 will be back in position to engage the pawl to disengage the clutch. Under the influence of the clutch, the heads 8 and 10 can be moved through one cycle at a time.

In order to prevent overrunning of the heads 8 and 10 a friction brake is provided. This brake is shown, in general, at 150 in Fig. 1, and a cross sectional detail is shown in Fig. 7. Two brake drums 152 and 154 are mounted on the shafts 36 and 50, and engaging these drums are brake shoes 156 and 158, the shoes being constantly spring pressed against the drums by the springs 160 which may be adjusted for varying the braking effect by the means shown. The brakes are on at all times but are not of sufficient strength to hamper the operation of the machine. They merely prevent overrunning when the power is removed.

*Embossing dies*

Figure 25:
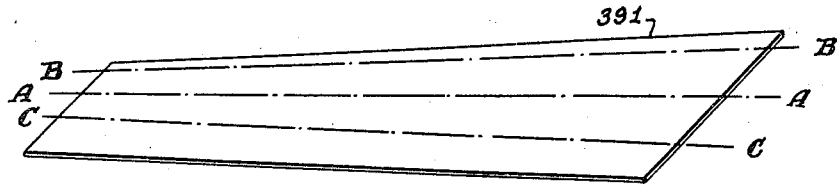
Figure 26:
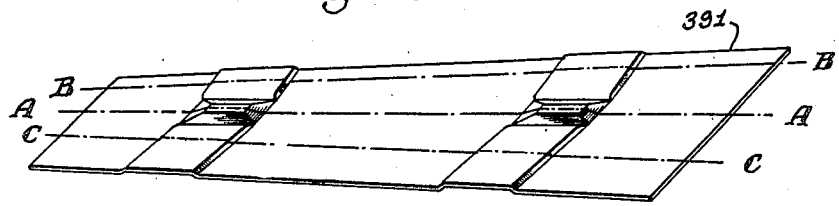
Figure 27:
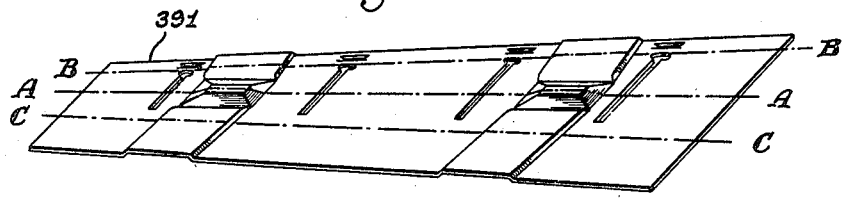

The metallic blank shown in Fig. 25, on which this machine operates, is fed in by the operator from the front of the machine, which, as explained, is at the right of Figs. 2 and 7. The first operation which the machine performs is that of embossing certain transverse portions 25a of the blank to produce the formation shown in Fig. 26 to provide clearance for clips (not shown) which band the leaves of motor vehicle springs together. To accomplish this result the embossing dies are mounted between the sloping portion of bed 21 and the sliding head 8.

Each pair of dies is mounted in a sub-frame which is for the purpose of holding them in alinement. This sub-frame, which consists of two parts, is then bolted in place, the lower half being bolted to the base 21 and the upper half to the head 8. This construction may be seen from an inspection of Figs. 14 and 16.

Referring to Fig. 14, which is a section on the line 14—14 of Figs. 13 and 15, it will be observed that the sub-frame consists of a laterally adjustable base plate 162, which may be secured to base webs 22 and 24 by means of bolts 166, the heads of which bolts engage the T-slots 164 and the shanks of which bolts extend upwardly through the plate 162 to secure the latter by means of the nuts 168, see Fig. 17. To ensure proper positioning of the plate 162, a key 170 extends transversely of plate 162 making a close fit with the upper portion of the T-slots 164.

Suspended below the plate 162 and between the webs 22 and 24 is a cushioning mechanism generally designated 172. The mechanism 172 includes two rods 174 and 176 which are threaded into the under side of the plate 162 and have at their lower ends nuts 178 and 180 which support a plate 182 which in turn supports two rubber cushions 184 and 186. The cushions 184 and 186 have, resting on the top of them, a plate 188, and rods 174 and 176 pass freely through holes in the plate 188 and, when downward pressure is applied thereto, the rubber cushions 184 and 186 are compressed.

Referring now to Fig. 13, the base plate 162 of the die can be seen to be longer than the secondary base plate 190 which is supported above the plate 162 by means of pins 192 which rest on the plate 188 and extend vertically through guide holes in the base plate 162. There are six of these pins, three to the right of the embossing die, as seen in Fig. 13, and three to the left of the die. The secondary base plate 190 is prevented from upward movement beyond a certain height by screws 194 which, while having their heads countersunk in the plate 190, pass freely therethrough and are screwed into the base plate 162. From this construction it will be seen that the secondary base plate 190 may be forced downwardly a limited distance, the movement being resisted by the cushion 172.

The embossing die itself, the lower half of which is designated generally by the numeral 196, and is plainly shown in Figs. 13, 14 and 16, is entirely separated from the secondary base plate 190, there being, however, a fairly close fit between the two. As shown in Fig. 14, the lower half of the die 196 is secured directly to the base plate by means of screws 198. The upper half of the die structure is shown in Figs. 14 and 16 in section and in Fig. 15 in plan. There is an upper base plate 200 which is secured by bolts to the transversely extending T-slots 202 in the head 8, this arrangement being such that the plate 200 may be adjusted laterally. The upper half of the die 204, including the adjacent surfaces 205, is secured by screws 206 directly to the upper base plate 200. Surface 205 and plate 190 grip the blank tightly so that it will not wrinkle during the embossing operation. In order that the vertical alinement between the upper and lower halves of the die may always be correct, the base plate 162 and the upper base plate 200 carry at their ends the bosses 208 and 210 which are vertically drilled and into which extend respectively the closely fitting guide rod 212 and 214. These guide rods 212 and 214 are pinned in the bosses 208 but are free to slide in the bosses 210. In this way, as the head 8 moves down to bring the two halves 196 and 204 of the die together the alinement thereof will be correct.

If a second embossing operation is necessary on the blank to provide for another spring clip another pair of dies may be introduced, such a set being shown at 215 in Fig. 1, the plan view of the lower half of this die appearing at 217 in Fig. 13 and the upper half of the die at 216 in Fig. 15. The general construction of this extra pair of dies is similar to that already described, and the same numerals have been used to designate similar parts.

Punches

Passing now from the embossing dies, the construction of the two sets or groups of punches will be explained. The first set of punches results in the formation of the blank shown in Fig. 27. In this punching operation only a pair 217a of each of a plurality of transverse slots 218a are made and one strap 219a at the end of each slot is formed, Fig. 27. In the final punching operation the transverse slots 218a are completed and straps 220a are formed at the other ends of the slots, resulting in the blank shown in Fig. 28. The purpose of punching the transverse slots 218a in two operations will be explained hereinafter with the mechanism for accomplishing this result.

Referring to Fig. 13 which shows a plan view of the lower half of the punches, it will be seen that there is a series of four units, each of which contains a first and second operation punch. These units are designated as 218, 220, 222 and 224. As unit 220 is typical of the other units and is shown in detail in section in Fig. 14, particular reference will be made to it. This unit consists of a longitudinally extending base plate 226 secured to the transverse webs 24 and 28 by the means of bolts in conjunction with the T-slots 228 and 230. By this means base plate 226 may be adjusted laterally of the machine. Base plate 226 is cut away in part to provide the openings 232 and 234 through which the punched out metal may fall.

On the upper surface of base plate 226 and extending longitudinally thereof is the T-slot 236 in which is positioned the heads of the bolts extending upwardly through the sub-base plates 238 and 240. By this arrangement the sub-base plates 238 and 240 may be adjusted longitudinally of the base plate 226 and the bed of the machine. Sub-base plates 238 and 240 are likewise cut away in part, as at 242 and 244, through which passages the punched out metal may pass.

Figure 28:
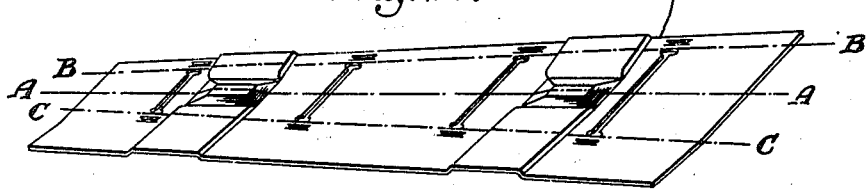

Mounted on top of the sub-base plates are the dies 246 and 248 which are adapted to receive the descending punches 274 and 276 which are attached to the head 12 which will be described hereinafter. Each pair of dies in the present instance consists of the narrow slotters 247 and 249 which, in cooperation with the upper punches 274 and 276, will produce a single slot in the blank 391. The slot 247 in the first die is enlarged at one end, while the slot 249 in the second die of the pair is enlarged at the other end, the result being that the finished slot 218a in the blank 391, after the two punching operations, has the enlarged portions at the ends of the slot as shown in Fig. 28.

Figure 29:
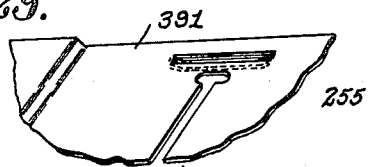

Adjacent the enlarged end of each of the slotters 247 and 249 is a small die 251 extending transversely thereof and adapted in cooperation with a punch 253 to produce the strap 220a which are preferably short, slightly depressed portions, as is shown in Fig. 29, the said straps being connected at its ends with the blank, but severed therefrom along the sides. Thus, in the finished blank, there is a strap 220a at each end of each slot. These straps 219a are for the purpose of holding a narrow band of metal (not shown) in position over each slot, which bands close the slotted openings 218a. The slotted openings 218a are provided so that an elongated casing, Fig. 30, formed of one of the blanks will have longitudinal flexing movement.

Extending longitudinally of each of the sub-base plates 238 and 240 are threaded holes 250 and 252, see Fig. 16, of the same size and having their longitudinal axes coinciding. A threaded rod 254 having a left hand thread on that part which engages the threaded portion of base 240 and a right hand thread on that portion which engages the threaded base 238, is positioned as shown in Fig. 16. This rod has pinned to it a collar 256 arranged between a pair of bosses attached to base 226 so that longitudinal movement of the threaded rod 254 is impossible. It will be apparent that as rod 254 is rotated to the right or the left the dies 246 and 248 can be moved closer together or farther apart but regardless of their longitudinal adjustment they will always stay in alinement because of the guiding effect of T-slot 236.

As the units 218, 220 and 224 are similar to unit 222 just described, further description of the other units is believed unnecessary. In the case of unit 224, the two sub-bases may or may not be adjustable longitudinally, as in the practical operation of the machine, one pair of punches may remain fixed, the others being adjusted with respect thereto. However, unit 224 could be adjustable and one of the other units could be used as reference points.

Turning now to the upper half of the punches, a plan view may be seen in Fig. 15 in which there is a series of units 258, 260, 262 and 264, each unit comprising a pair of punches arranged to cooperate with the corresponding lower dies. A cross sectional view of unit 260 is shown in Fig. 14 and will be described as typical of all the units. A longitudinally extending plate 266 is anchored to the head 10 by means of bolts having their heads in transversely extending T-slots 267 on the head 10. This provides for lateral adjustment of base plate 266. A T-slot 268 extends longitudinally of plate 266, which T-slot carries a plurality of bolts which secure the sub-base plates 270 and 272 in position. Depending from the sub-base plates 270 and 272 are the punches 274 and 276. Adjacent the ends of punches 274 and 276 are the short transverse punches 253 which form the straps 220a in cooperation with dies 251. Surrounding the punches are the spring operated strippers 278 and 280, the use of which in connection with punches is well known.

To position the punching units on the bed of the machine and head 10, the head 10 is moved downwardly, and the base plates 266, 270 and 272 adjusted, until the punches 274 and 276 enter the dies 246 and 248. With the punches and dies thus alined the upper and lower units are positioned as desired and thereafter the bolts securing the lower and upper bases to the bed of the machine and to the head are tightened. By this procedure alinement is assured.

When it is necessary to adjust the punches longitudinally, the bolts securing sub-bases 238, 240, 270 and 272 are loosened and the head 10 is lowered until punches 272 and 276 are positioned within dies 246 and 248. Thereafter the adjusting screw 254 is rotated until the punches are suitably positioned, at which time the bolts are retightened to maintain the alinement.

Hereinafter, the upper punches and the cooperating lower dies will be referred to simply as punches in that they cooperated to punch the blank.

*Trimming shears or trimming dies*

In addition to the embossing dies and the punches, there are two shears or trimming dies for trimming off a suitable amount of metal from the ends of each blank so that the ends of the finished cover will meet properly. In Fig. 17, which is a section on the line 17—17 of Figs. 13 and 15, are seen shears which trim the small end of the blank. These shears comprise a lower shear blade 282 mounted on a longitudinally adjustable base 284 which in turn is laterally adjustable on the transverse webs 24 and 28. A plan view of the lower blade of the shears is shown in Fig. 13. The cooperating upper shear blade is designated generally by the numeral 286 and is shown in section in Fig. 19. Behind the lower shear blade 282 is a stripper 288 and in front of the upper shear blade 286 is a spring-pressed hold-down 290 which serves the purpose of gripping the blank prior to the punching and shearing operation. A similar spring-pressed hold-down 291 for a similar purpose is mounted adjacent the hold-down 290.

The shears used to trim the large end of the blank is shown in elevation in Fig. 18 and in section in Fig. 20. The lower shear blade 292 is mounted on a base plate 294 which is laterally adjustable on the transverse webs 24 and 28. Due to the fact that this shear blade operates at an angle the equivalent of longitudinal adjustment may be obtained by moving the blade laterally. The upper shear blade is shown in section at 296 in Fig. 20 having in front of it a combination hold-down and stripper 298. Both the shears for trimming the small end and the large end of the blank are guided vertically by the guide rods 300 which slide in suitable shearing blades. Associated with the shear blade 282 is a stop pin 302 which accurately determines the amount of metal that may be sheared from the end of the blank.

*Adjustable stops*

In order that the blank may be accurately positioned with relation to the embossing dies and with the punches, there is provided a plurality of adjustable stops. Referring more particularly to Fig. 13, the blanks as at 304, shown by dot and dash lines, are positioned between the embossing dies. Since the trapezoidal blanks vary in dimensions depending upon the spring on which they are to be used it is essential that adjustable stops be provided to properly position blanks of varying tapers. Therefore, the adjustable stops 306, shown in detail in cross section in Fig. 24, are provided in the first stage. These stops are of sufficient length to extend upwardly through a longitudinal slot in the sub-base plate 190 to engage the blank. The adjustment is effected by means of a threaded adjustment rod 308 extending through a longitudinal slot in the sub-base plate 190 to engage the blank. The adjustment is effected by means of a threaded adjustment rod 308 extending through a nut 310 fixed to the base 190. The rod 308 is rotatably connected with a slidable shoe 312 on which is mounted the stop pin 306. Thus, by rotating the rods 308 the stop pins may be adjusted, as desired.

A fixed stop pin 314 is mounted on the sub-base plate 190 and determines the transverse position of the blank at the embossing stage.

At the first punching stage there is a stop pin 316 to engage the small end of the blank, for determining the lateral position thereof, and a series of stop pins 318 are provided on the punching units 218, 220 and 224. The stop pins are connected with the longitudinally adjustable dies by the screws 254 and may be set so that the ends of the blank are parallel to the longitudinal axis of the machine regardless of the angularity of the tapered sides of the blank.

At the second punching stage the end stop pin 302, already referred to, determines the lateral position of the blank. The remaining stop pins 320 are two in number, and are mounted on adjustable mechanism shown in detail in Fig. 21. As can be seen in this figure, stop pin 320 is mounted on an angular member 322 which may be moved longitudinally be rotation of the threaded screw 324 which is carried by the fixed support 326 mounted on the transverse web 28.

By means of the several foregoing stops, blanks of various sizes may be accurately and automatically positioned as they pass through the machine in the various stages, resulting in identical products for any given setting of the stops, dies and punches.

At the embossing stage the blank is fed by hand and may thus be firmly positioned against the end stop 314. At the subsequent stages, however, positioning is preferably effected mechanically and to this end I provide push rods which will now be described. Referring to Fig. 22, the cam 66 is pinned on and to the outer end of shaft 42, and for each operation of the machine the cam 66 revolves once. As the embossing dies and punches do not operate on the blank until close to the bottom of the stroke of the heads 8 and 10 there is time during the descent of the heads to accurately position the blank. This is accomplished as follows. Cam follower 328, under the influence of cam 66, moves to the right during the first part of the cam's rotation. Cam follower 328 is attached to a lever 330 which is pinned to a shaft 332. Levers 334 and 336 are also pinned to shaft 332 with the result that they are moved to the left in Fig. 22 when cam follower 328 is moved to the right. Lever 334 at its upper end has a loose connection with a horizontal push rod 338 which extends through a slide in guide member 28a. Similarly, the lever 336 is loosely connected at its upper end with a horizontal push rod 340 which also extends through a slide in the guide member 28a. Push rods 338 and 340 have in their ends telescoping extensions 342 and 344 with V-shaped jaws so positioned that when they are moved toward the left in Figs. 13 or 22 the V-shaped jaws will engage the right hand edges of the blanks. Thus, as the machine is started, the blanks will be pushed to the left by the operation of push rods 338 and 340 to engage stops 316 and 302. This positioning takes place, however, before the head 10 has descended far enough for the punches to engage the blank. Thereafter, the push rods 338 and 340 return to their position of rest at the right until the next operation of the machine.

Ejectors

The blank travels from one operation to another under the influence of gravity, but in order to permit this movement it is necessary either to withdraw the stops that have held the blank in position for the previous operation or else to lift the blank a sufficient amount so that it may slide downward over the stops. I have found it more convenient to lift the blank than to withdraw the stops.

To release the blank from stop pins 306 which held it in position in the embossing stage, there is the mechanism shown in detail in Figs. 9 and 23. On shaft 50, which rotates counterclockwise in Fig. 9, is a cam 346 shown in the position of rest. From the location of the cam surface 348, it is apparent that the cam will lift the follower 350 just before the finish of the cycle to raise the ejector bar 352 shown in Fig. 23 by means of the levers and links 354, 356, 358 and 360. There are three ejector bars 352, as can be seen in Fig. 13, and these are raised sufficiently to lift the blank over stops 306 whereupon the blank slides downwardly along bars 368 shown in Fig. 9 until it engages stops 318.

On the shaft 36, which revolves counterclockwise, as seen facing Fig. 9, is a cam 364, similar to cam 346, which operates to lift the follower 366 at the end of the cycle thereby raising the ejector bars 368, shown in Figs. 9 and 13, by means of the levers and links 370, 372, 374 and 376. Upon being raised sufficiently to slide over stops 318 the blank descends further by gravity until it engages stops 320 at the send punching stage.

After the final punching operation the blank is raised over stops 320 by the operation of cam 378 which at the finish of the cycle raises follower 380 and by means of links and levers 382, 384, 386 and 388 lifts ejector bars 390 sufficiently to cause the blank to pass over stops 320. Gravity thereupon causes the blank to slide out of the machine and be carried away by the gravity conveyor 12.

Method of adjusting punches and positioning blanks

The spring casing, which is to be formed from the blank, comprises a channel-shaped section adapted to extend around three sides of the spring and a cover section that is connected with the channel-shaped section either as an integral part or a separate piece to close the fourth side. The channel-shaped section is symmetrical since the spring it covers is symmetrical. Thus, when the channel-shaped section is unfolded, it will be symmetrical with respect to a central line of reference.

In Fig. 25, the central line of reference A—A is the line which designates the longitudinal center of the channel-shaped portion that encloses three sides of the spring. The lines B—B and C—C are the lines designating the terminal edge of the casing and these lines are, of course, symmetrical with respect to the center line A—A. The portions of the blank beyond B—B and C—C extend on the fourth side of the spring.

To make the channel-shaped section flexible it is essential that the transverse slots 218a extend between lines B—B and C—C, and the angle that the slots, as well as the embossed portions, make with the line B—B should preferably be the same as the angle they make with the line C—C. This result is readily accomplished by the means employed in the setting of the various dies, punches and stops.

In actual practice the blank from which the spring casing is made is symmetrical and trapezoidal in shape but the machine is adapted to punch slots properly disposed in an unsymmetrical blank if required. This is accomplished by properly locating the several dies, punches and stops that engage the blank.

Referring to Fig. 13 the embossing die and blank are positioned with relation to each other so that the embossed sections will be adjacent the spring clips when the cover is applied to a spring.

By reference to the spring to be covered, the distance from the end of the cover to the first embossed section and to the second embossed section may be determined. Stop pin 314 is then positioned at a suitable distance from the first embossing die 196 and the second embossing die is shifted laterally by means of the adjustments until it is the proper distance from the first die. The center line Y—Y of the dies must coincide with the central line of reference A—A of the blank. To accomplish this, stops 306 are adjusted until the blank, when positioned thereagainst and also against end stop 314, has its center line A—A coinciding with center line Y—Y.

After the embossing operation has taken place ejectors 352 will raise the blank over stops 306 so that it may advance to the first punching stage.

Referring again to Fig. 13, attention is called to a transverse center line X—X. It will be observed that the enlarged ends of each of the dies 247 and 249 in unit 218 are located at an equal distance on either side of the line X—X.

Thus, as adjustment screws 254 are rotated the distance of the end of the die 247 from the line X—X will always remain equal to the distance that the end of the die 249 is from the line X—X. Similarly dies 247 and 249 in the units 220, 222 and 224 are an equal distance from the line X—X.

If, now, dies 247 in the units 218, 220, 222 and 224 are set so that a straight line may be drawn through the ends of the dies then the angularity of this line with the center line X—X will be the same as the angularity of a line drawn through the ends of dies 249 with respect to center line X—X.

Because of the nature of the adjustments in units 218, 220, 222 and 224, the several dies can be set so that a line through their ends may form any desired angularity with the center line X—X. Thus, if the blank is positioned so that it may be operated on by punches in the first stage and thereafter this blank is transferred to the second punching stage and set in a position parallel and longitudinally alined with its position in the first punching stage, then it follows that the resulting continuous slots will be such that lines drawn through their ends, as B—B and C—C of Fig. 23, will be symmetrical with respect to the center line A—A.

In setting the punches to make any particular casing the procedure is as follows. The angularity of lines B—B and C—C is determined by reference to the spring to be covered. This angle is divided in half and the dies 247 are then set so that the angle between the line X—X and a line through the ends of the dies is equal to one-half the angle between B—B and C—C. By this adjustment, the angle between lines through the ends of dies 247 and 249 will be equal to the angle between lines B—B and C—C.

Stops 318 are, in the present instance, a uniform distance from the ends of dies 247 for the reason that it is desired to form the edge portion of the blank into a flange of uniform dimension. However, stops 318 could be varied if it was desired to have the distance between the ends of the slots and the edge of the blank other than uniform. After the punching operation at the first stage, the blank is held in position by stops 320 and end stop 302 at the second stage. These stops are set so that the blank at the second stage will be parallel to and longitudinally alined with its position in the first stage. Since stop 302 is the same distance from die 249 as stop 316 is from die 247 it follows that the dies of the second stage will be alined with and partially overlap the slots formed at the first stage. The length of the final slot is determined by the position of stops 320 which, however, will always be adjusted to keep the blank at the second stage parallel to the first. Thus, it is clear that by the simple expedient of setting the angularity of the dies 247 properly, the dies 249 will automatically be positioned correctly to produce finished slots in which the lines B—B and C—C drawn through the ends will be symmetrical with respect to the center line A—A, which is at right angles to the slots.

The end of the blank shown in a broken line at 391 is usually at right angles to line X—X since the typical blank is a trapezoid. However, it would appear that the angularity of the end of the blank could be varied, if desired, without affecting the slotting operation. In practice, however, if the blank is a true trapezoid, the end 391 is lined up in the direction of travel of the blank and the stops 318 are moved until they just engage the leading edge. This automatically locates punching dies 347 for the first punching operation.

Likewise in the second punching stage the ordinary procedure is to line the end of the blank 391 up with the line of travel by adjustment of stops 320. In this way the blank will be parallel to its position at the first punching stage. Stops 320 may then be moved backward or forward equal distances by rotation of adjusting screws 324 until the blank is positioned with relation to dies 249 to give slots of the proper length.

In Figs. 30, 31 and 32 there is shown a spring cover formed of one of the prepared blanks shown in Fig. 28, but it should be understood that the present invention relates to the preparing of the blank and is not to be limited by the form, shape and details of an article formed of the blank. The present spring casing includes a bottom wall 325, upstanding side walls 326 and 327 and a top wall 328 which is integral with the side wall 326. In Fig. 32, are the numerals A, B and C corresponding with like numerals on the views of Figs. 25 to 28 inclusive. As previously mentioned the blanks are bent along the lines designated B and C providing the bottom roll 325 and the side walls 326 and 327. The top wall 328 is bent inwardly from the side wall 326 and along its edge is provided with a flange 330 cooperable with a similar flange 331 of the side wall 327 to lock the top wall and the side wall 327 together after the casing has been positioned around a spring to be covered. In the present instance, the cover 328 is so formed and bent at its juncture with the casing side wall 326 that the cover may be pressed down to secure it tightly to the casing side walls as shown in Fig. 31.

Operation of the machine

The operation of the machine is as follows: The operator standing in front and conveniently near the treadle 110 places a blank of the type shown in Fig. 25 on top of the lower half of the embossing dies and against stops 306 and 314. Thereupon the treadle 110 is depressed causing the operation of clutch 34. This causes the rotation of eccentrics 56 and 58 and 62 and 64 thereby drawing heads 8 and 10 downwardly. The connecting rods have been so adjusted that the upper half of the embossing dies cooperates properly with the lower half to create the formation shown in Fig. 26. The heads 8 and 10 then ascend and come to a stop at the top of the stroke, the treadle 110 having been previously released thereby causing automatic disengagement of the clutch at the end of one revolution of shaft 36. Just prior to the end of the upward stroke, the ejector bars 352 operate to free the blank of stops 306 whereupon the blank descends by gravity to the first punching position where it is stopped by the stops 318.

The operator now inserts another blank at the embossing stage as described heretofore. He then operates foot treadle 110 causing the heads 8 and 10 to descend as previously described. Just prior to the operation of the first stage punches on the first blank, push rod 338 operates to force the blank to the left until it engages stop pin 316. Thereafter the first blank is punched and the second blank embossed.

As the operator has again released treadle 110 the machine stops at the top of the stroke but ejector bars 352 and 368 have operated to enable the first blank to slide downwardly to the second punching position where it is held by stops 328 and the second blank to slide downwardly to the first punching position where it is held by stops 318.

The operator then inserts a third blank at the embossing stage, positioning it as before against stops 306 and 314. The treadle 110 is again operated, resulting in the descent of heads 8 and 10. As there is now a blank in each stage, the machine performs three sets of operations simultaneously, namely, embossing of the third blank, punching of the second blank at the first stage, and punching the first blank at the second stage. It should be pointed out that just prior to the operation of the punches at the second punching stage the push rod 340 operates to force the blank to the left until it encounters stop 320.

At the same time that the second punching operation takes place at the third stage, the two trimming shears or trimming dies, one at either end of the blank operate. The narrow strip of metal that is trimmed from the small end of the blank by shears 282 and 286 is between the blank and stop pin 332 and these strips would accumulate there were it not for the ejector means in the form of an air blast directed at the strips from the nozzle 392 at the end of air tube 394 shown in Figs. 2 and 13. This air blast operates just after the strip has been sheared from the end of the blank. The mechanism for controlling the air blast is shown in Fig. 2 and consists of a cam 396 mounted on shaft 36, a follower 398 and the levers and links 400, 402 and 404. Lever 404 oscillates the valve 406 so that the hold 408 shown in detail in Fig. 3 is lined up with the source of compressed air 410 and air line 394 once during each cycle and immediately after the blank has been sheared.

When the heads 8 and 10 have stopped at the top of their strokes at the end of this last cycle the first blank is raised by means of ejector bars 390 and slides away from the machine on the gravity conveyor 12. The second blank advances to the third stage, the first blank to the second stage and a new blank is inserted by the operator in the first stage.

Thus, three operations are performed simultaneously and for each blank inserted in the machine a completed blank emerges. It is apparent, therefore, that from my construction high production may be obtained while the services of only one operator are necessary. At the same time by the various adjustments and automatic alining and positioning mechanisms it is possible to emboss and slot whatever blanks may be necessary to fit the various size springs used on automotive vehicles. It is necessary to provide a separate set of punches for each size of spring cover and it is believed clear that additional embossing dies or punches may be introduced if needed.

In addition, by having two heads, one for the embossing dies and one for the punches, vertical adjustment is greatly simplified. In practice, the embossing dies do not wear away as rapidly as the punches. Hence, the former need but infrequent adjustment, while the latter need adjusting after each sharpening. Thus, as the punches gradually become shorter due to sharpening, the head 10 must be moved closer to the base 21 to compensate therefor. This may be done by adjusting the connecting rods that couple head 10 with eccentrics 56 and 58 without disturbing the setting of head 8.

While I have shown and described my invention in detail, it is to be understood that the same is to be limited only by the appended claims for many changes may be made without departing from the spirit and scope of the invention.

What I claim is:

1. In a machine for forming a slotted spring casing blank, a plurality of parallel slotting punches longitudinally and laterally adjustable, an end stop and fixed side stops associated with said punches for positioning a blank relative thereto, a second group of parallel slotting punches longitudinally and laterally adjustable, means to convey said blank from said first group of punches to said second group of punches, each punch of said first group being associated with a punch of said second group to form a pair of punches, the punches of each pair being in alignment and laterally adjustable as a unit, an adjusting screw connecting said pair of punches together so that each punch of said pair may be adjusted longitudinally with respect to the other, an end stop member, and adjustable side stop members for positioning said blank with respect to said second group of punches, said punches being arranged to make a plurality of slots of varying lengths in the blank.

2. In a machine for preparing slotted spring casing blanks, a plurality of punching units, each unit comprising a pair of slotting punches longitudinally alined and laterally adjustable, the punches of each pair being the same distance on either side of a common line of reference, individual adjustment means on each unit whereby the punches of each unit may be moved simultaneously toward or away from said line of reference, means for automatically positioning a blank at the punches on one side of said line, means for operating said punches, means for conveying said blank to the other punches on the other side of said line, means for automatically positioning said blank at said other punches parallel to its first position, and means for operating said other punches to form continuous slots.

3. In a machine for preparing spring casing blanks, at least two pair of punches, each pair comprising a unit, said punches having aligned longitudinal axes, said units being positioned laterally of each other, a stop associated with one punch of each pair for positioning said blank with respect thereto, adjustable stops for positioning said blank with respect to said other punches, means for freeing said blank from said first stops, means for conveying said blank for engagement with said adjustable stops, means for freeing said blank from said adjustable stops, adjustment means connecting each pair of punches so that said punches may be moved longitudinally equal distances in opposite directions, said units being so positioned that the longitudinal axes of said punches will be substantially at right angles to a line joining the points midway between selected opposite ends of said pairs of punches.

4. In a machine for preparing a spring cover blank a punch unit having a plurality of laterally and longitudinally adjustable punches, stop means for positioning the blank for operation thereon by said punches, a second punch unit having a plurality of punches each of which is axially alined with a punch of said first-named unit to form a pair, stop means for positioning said blank for operation thereon by said second group of punches, each punch of the alined punches being arranged for independent lateral or longitudinal adjustment together, means for simultaneously conveying blanks from the first group of punches to the second group of punches, and from the second group of punches out of said machine, and means for operating said first group of punches and said second group of punches to act simultaneously on the blanks.

5. In a machine for preparing spring casing blanks, a first and second group of punches, said punches being arranged on a sloping bed, stop means for positioning a blank at said punches, ejector means for raising the blanks above said stops to slide by gravity to the next stop means, common power and clutch means for operating said punches simultaneously, the punches of said first and second groups of punches being longitudinally aligned in pairs and the stops associated with said groups of punches being positioned so that the punches will operate in part on a common portion of the blank.

6. In a machine for preparing spring casing blanks, a plurality of groups of punches, said groups of punches being arranged on a bed, stops for positioning a blank at said punches, means for moving a blank from one group to the next, and independently adjustable but simultaneously operated means having common power and a common clutch to actuate said punches, the punches of said first and second groups of punches being longitudinally alined.

7. In a machine for preparing spring casing blanks, a bed having an inclined elongated supporting surface for the blanks, a movable carrier member carrying a plurality of punches for slotting the blank, stop means associated with said punches and arranged to position the blank thereneath, means operable subsequent to the operation of said plurality of punches to release the blank from the stop means so that the blank can slide down the inclined surface, a second movable member spaced from said first-named movable member longitudinally of said elongated inclined surface and carrying a plurality of punches, stop means associated with said second-named punches to stop and position the blank with relation thereto, said second-named plurality of punches being spaced transversely of said first-named plurality of punches so that said second-named plurality of punches can form a plurality of slots respectively intersecting said first-named plurality of slots, and means operable subsequent to operation of said second-named punches to release the blanks from said second-named stop means.

8. In a machine for preparing spring casing blanks, a bed having an inclined elongated supporting surface for the blanks and extending downwardly from the front to the rear thereof so that the blanks will move along the supporting surface by gravity, two groups of punches arranged above said supporting surfaces, said groups being spaced longitudinally and transversely, stop means associated with one of said groups of punches and to stop movement of a blank along said inclined surface below said one group of punches, laterally positioned stop means, means operable to move the blank transversely of said supporting surface into contact with said laterally positioned stop means to position the blank in desired relation to said one group of punches, means operable to release the blank from said stop means subsequent to operation of said one group of punches so that the blank can slide down said inclined surface to the other group of punches, stop means associated with said other group of punches for stopping the downward movement of the blank, laterally positioned stop means associated with said other group of punches, means operable to move the blank transversely of the supporting surface into contact with said second-named laterally positioned stop means to locate the blank properly with respect to said other group of punches, and means operable subsequently to operation of said other group of punches to release the blank from said third-named stop means.

9. In a machine for preparing spring casing blanks, a bed having an inclined supporting surface for the blanks so that the blanks can slide down the bed by gravity, a plurality of die tools spaced along and above said bed, stop means associated with each of said die tools for retaining the blanks therebeneath, means for operating said die tools, ejector means operable to release the blanks from said stop means, and means operatively connecting said ejector means and said die tool operating means.

10. In a machine for preparing spring casing blanks, a bed having an inclined supporting surface for the blanks so that the blanks can slide down the supporting surface by gravity, a plurality of relatively movable die tools spaced along said bed in the direction of inclination of said supporting surface, stop means associated with each of said die tools for retaining the blanks therebeneath, upwardly movable ejector means associated with each of said stop means and operable to raise the blanks to release them from the stop means, means operable to actuate said die tools simultaneously, and means operatively connecting said die tool actuating means and said ejector means.

11. In a machine for preparing spring casing blanks, a conveyor bed having an inclined surface along which the blanks slide by gravity, a plurality of die tools arranged along said bed in the direction of inclination of the supporting surface, said die tools being staggered relative to each other, stop means associated with said die tools for stopping the blanks therebeneath in their downward travel on said inclined supporting surface, means for moving said blanks laterally to position them in desired position with respect to said die tools, stop means limiting lateral movement of the blanks, and means operable to release said blanks from said first-named stop means.

12. In a machine for preparing spring casing blanks, a conveyor bed having an inclined surface along which the blanks slide by gravity, a pair of die units arranged along said inclined surface, said die units being laterally spaced relative to each other, stop means associated with said die units for stopping the blanks therebeneath, means associated with one of said die units and operable to move the blanks laterally, stop means associated with said one die unit for limiting lateral movement of a blank to position the blank in proper relation with said one die unit, means to operate said die units, and means operatively connecting said die operating means and said blank moving means.

13. In a machine for preparing spring casing blanks, a conveyor bed having an inclined surface along which the blanks slide by gravity, a pair of die units arranged along said inclined surface, said die units being laterally spaced relative to each other, stop means associated with said die units for stopping the blanks therebeneath, a push rod associated with one of said die units and operable to move the blank laterally, stop means associated with said one die unit for limiting lateral movement of a blank to position the blank in proper relation with said one die unit, means to operate said die units, and means operatively connecting said die operating means and said blank moving means.

WALTER R. CHESLEY.